(12) United States Patent
Kim

(10) Patent No.: US 9,983,348 B2
(45) Date of Patent: May 29, 2018

(54) BACKLIGHT UNIT, LIQUID CRYSTAL DISPLAY DEVICE COMPRISING SAME, AND GAME MACHINE

(71) Applicant: TOVIS CO., LTD., Incheon (KR)

(72) Inventor: Yong-Beom Kim, Incheon (KR)

(73) Assignee: TOVIS CO., LTD., Incheon (KR)

( * ) Notice: Subject to any disclaimer, the term of this patent is extended or adjusted under 35 U.S.C. 154(b) by 480 days.

(21) Appl. No.: 14/429,366

(22) PCT Filed: Sep. 2, 2013

(86) PCT No.: PCT/KR2013/007880
§ 371 (c)(1),
(2) Date: Mar. 19, 2015

(87) PCT Pub. No.: WO2014/046394
PCT Pub. Date: Mar. 27, 2014

(65) Prior Publication Data
US 2015/0247966 A1  Sep. 3, 2015

(30) Foreign Application Priority Data

Sep. 20, 2012 (KR) .................. 10-2012-0104454

(51) Int. Cl.
*F21V 8/00* (2006.01)
*G07F 17/32* (2006.01)
*G02F 1/1335* (2006.01)

(52) U.S. Cl.
CPC ......... *G02B 6/0076* (2013.01); *G02B 6/0051* (2013.01); *G02B 6/0055* (2013.01);
(Continued)

(58) Field of Classification Search
CPC ....... G02B 6/0076; G02B 6/0086; F21V 1/06; F21V 14/006; F21V 14/04; G02F 1/1336; G02F 1/133615
See application file for complete search history.

(56) References Cited

U.S. PATENT DOCUMENTS 4,367,923 A * 1/1983 Ishikawa ............... G02F 1/1335
345/102
7,924,417 B1 * 4/2011 Lin ....................... G01J 1/4228
356/221

(Continued)

FOREIGN PATENT DOCUMENTS

JP   2000-222922 A   8/2000
JP   2006-006651 A   1/2006
(Continued)

OTHER PUBLICATIONS

Tae KR20100088962A (English Translation).*

*Primary Examiner* — Alexander Garlen
*Assistant Examiner* — Eric T Eide
(74) *Attorney, Agent, or Firm* — Rabin & Berdo, P.C.

(57) ABSTRACT

A backlight unit for a liquid crystal display device includes: a light source; a first light guiding panel which guides light emitted from the light source; a second light guiding panel which is disposed behind the first light guiding panel and is provided to be movable so as to be selectively disposed at a position of being overlapped with a predetermined area of the first light guiding panel in a back and forth direction and at a position of not being overlapped with the predetermined area in a back and forth direction; and a driving part which provides a driving force for moving the second light guiding panel.

14 Claims, 8 Drawing Sheets

(52) U.S. Cl.
CPC ......... *G02B 6/0088* (2013.01); *G02F 1/1336* (2013.01); *G07F 17/3211* (2013.01); *G02F 2001/133626* (2013.01)

(56) References Cited

U.S. PATENT DOCUMENTS

| | | | | |
|---|---|---|---|---|
| 8,027,580 | B2* | 9/2011 | Chang | G03B 17/00 |
| | | | | 362/606 |
| 8,847,849 | B2* | 9/2014 | Lee | G02B 6/0055 |
| | | | | 345/5 |
| 2011/0085109 | A1* | 4/2011 | Kim | G02F 1/13476 |
| | | | | 349/62 |
| 2012/0122549 | A1* | 5/2012 | Rasmussen | G07F 17/3211 |
| | | | | 463/20 |
| 2012/0236484 | A1* | 9/2012 | Miyake | G06F 1/1616 |
| | | | | 361/679.01 |
| 2013/0322111 | A1* | 12/2013 | Nishitani | G02B 6/0028 |
| | | | | 362/603 |
| 2014/0192550 | A1* | 7/2014 | De Zwart | G02B 6/0028 |
| | | | | 362/558 |

FOREIGN PATENT DOCUMENTS

| | | |
|---|---|---|
| KR | 10-2006-0049328 A | 5/2006 |
| KR | 10-2007-0055766 A | 5/2007 |
| KR | 10-2009-0127547 A | 12/2009 |
| KR | 10-0984804 B1 | 10/2010 |
| KR | 10-0989401 B1 | 10/2010 |
| KR | 10-1024657 B1 | 3/2011 |
| KR | 10-1047597 B1 | 7/2011 |
| KR | 10-2012-0040005 A | 4/2012 |

\* cited by examiner

[FIG. 1]
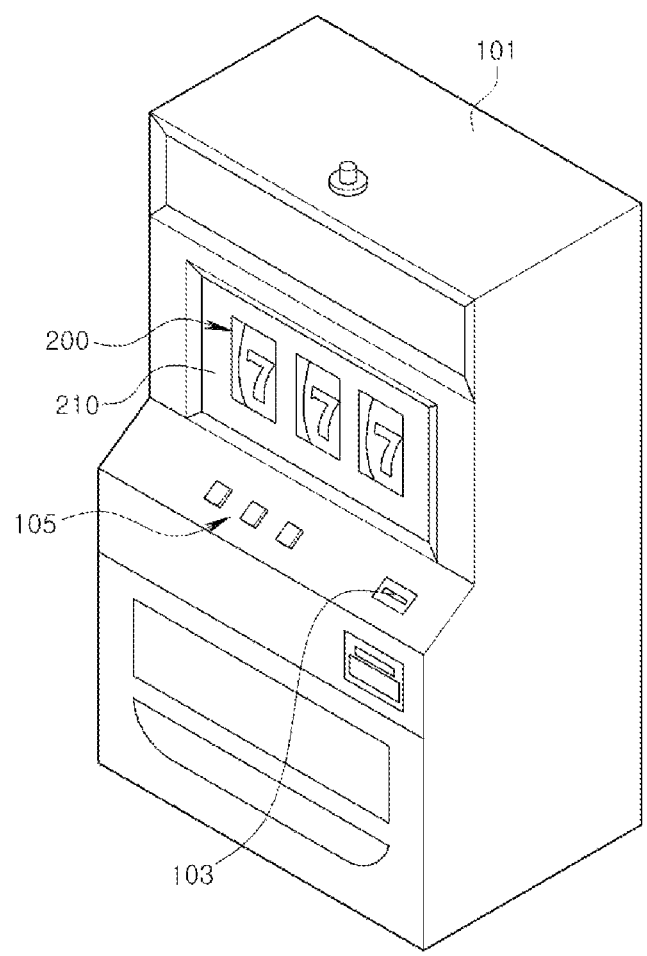

[FIG. 2]
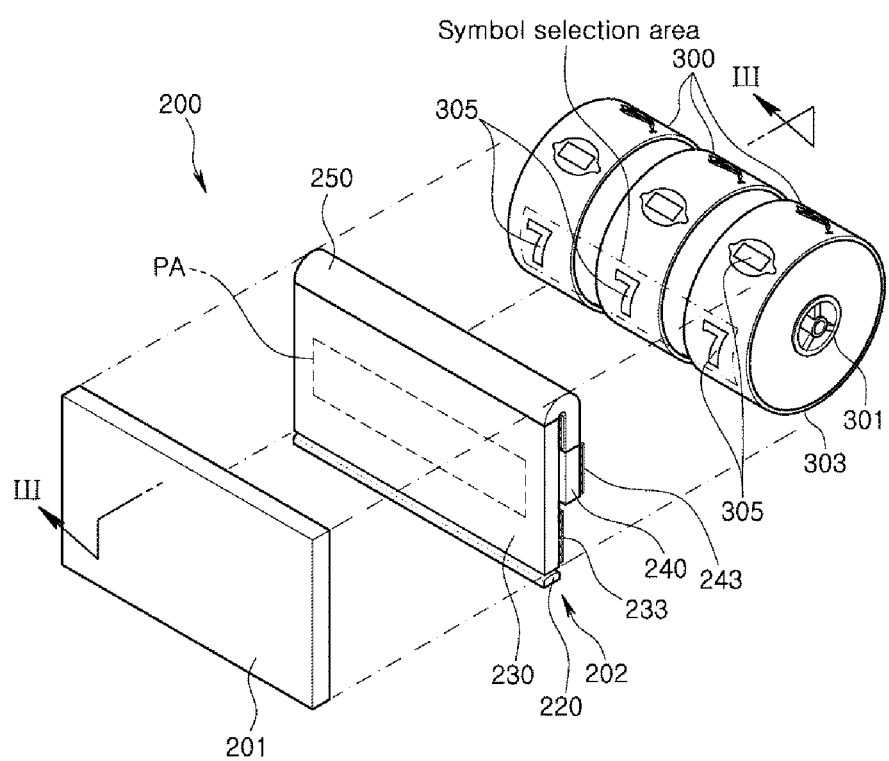

[FIG. 3]
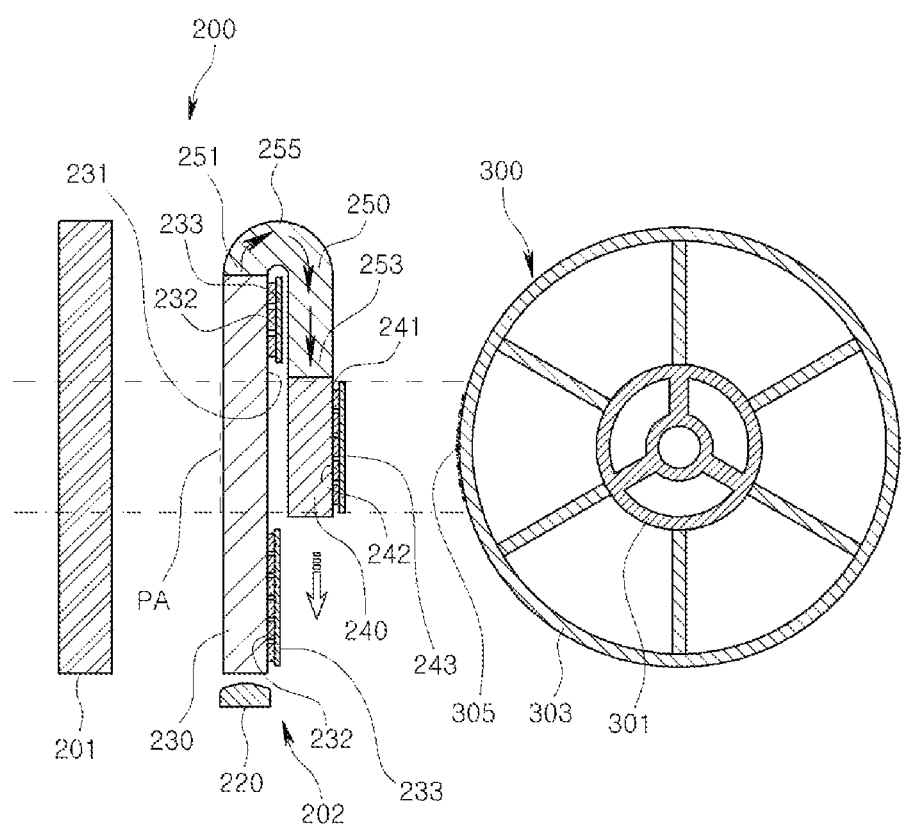

【FIG. 4】
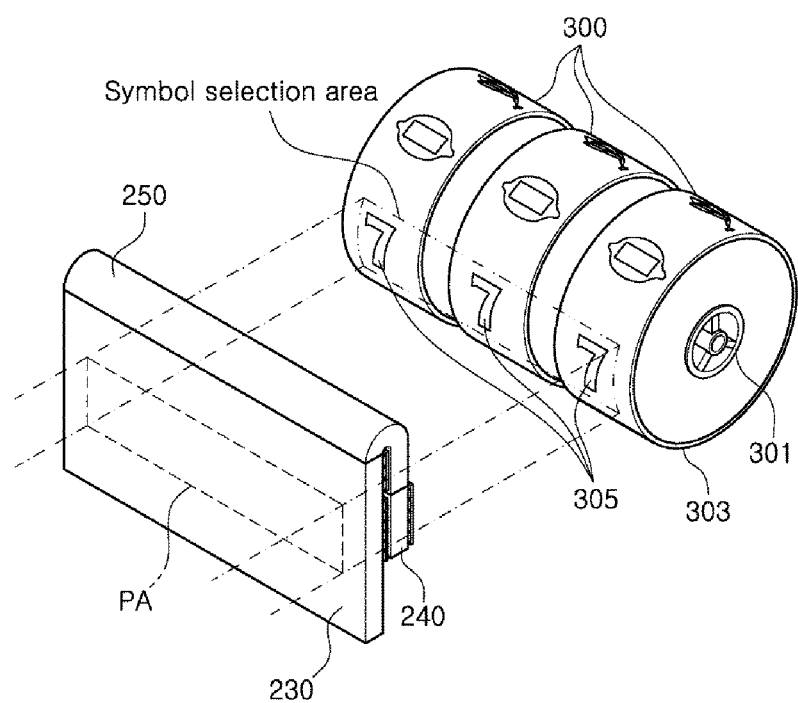

[FIG. 5]
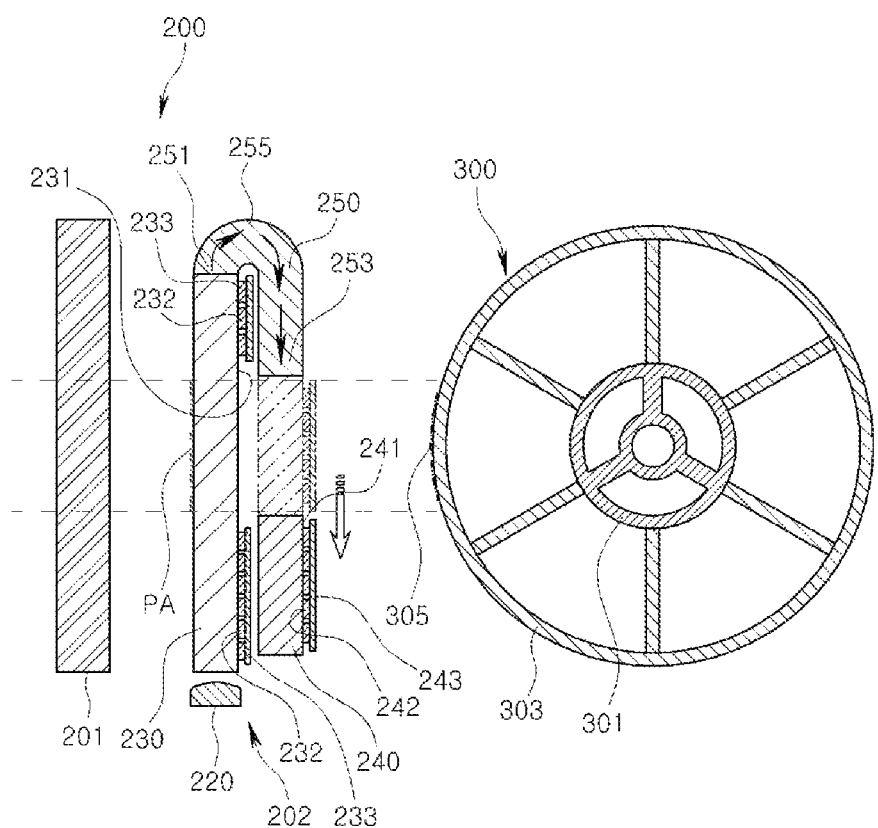

【FIG. 6】
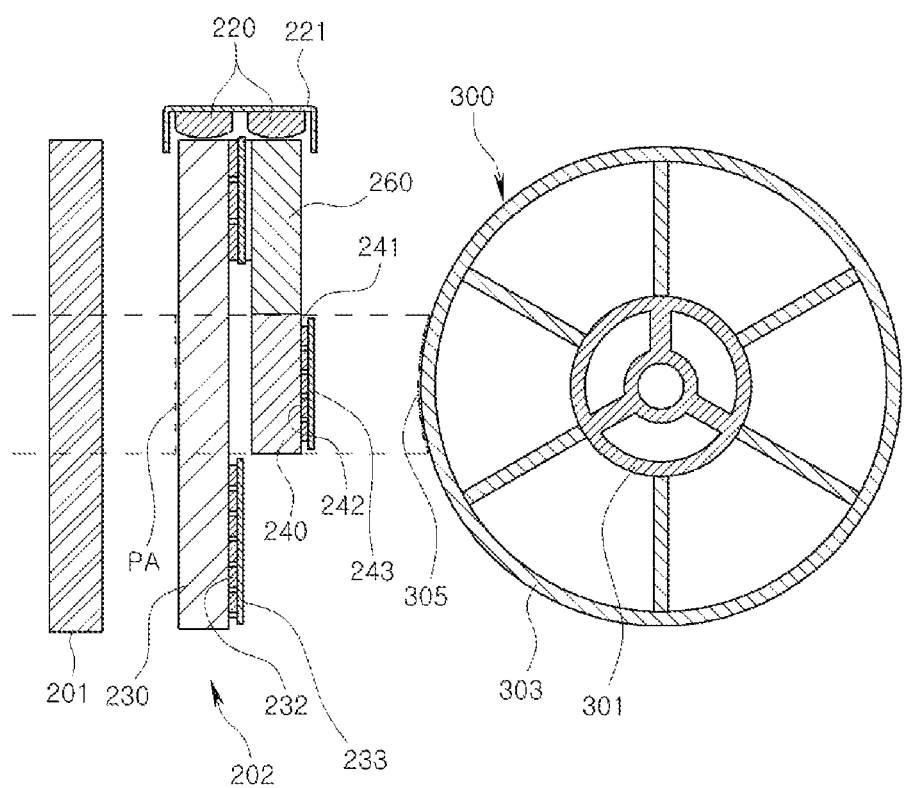

【FIG. 7】
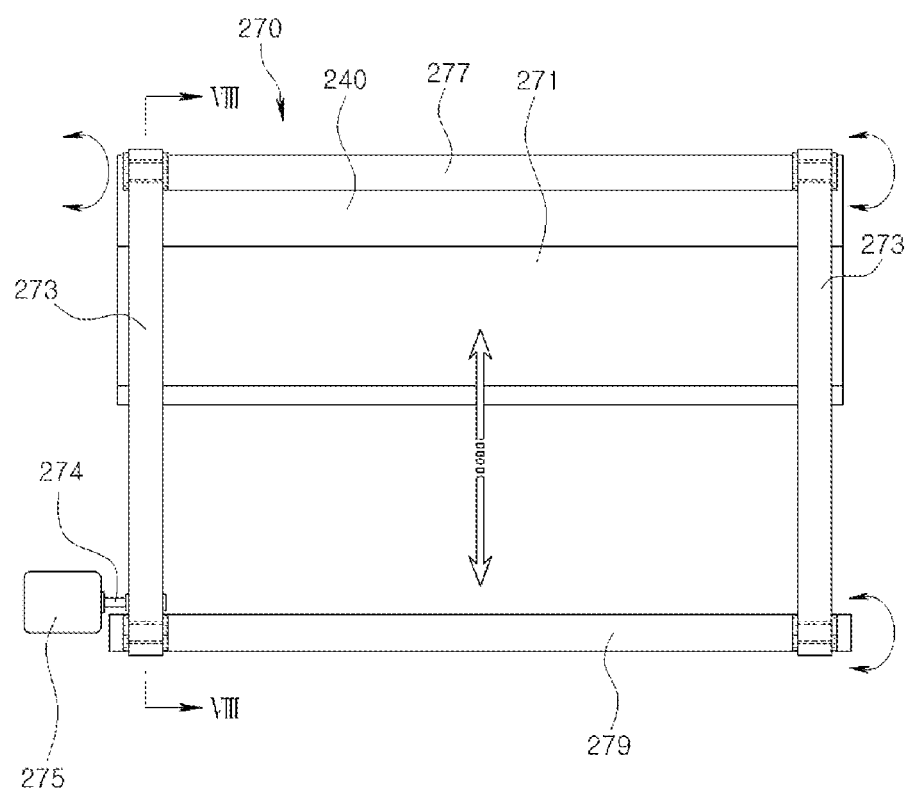

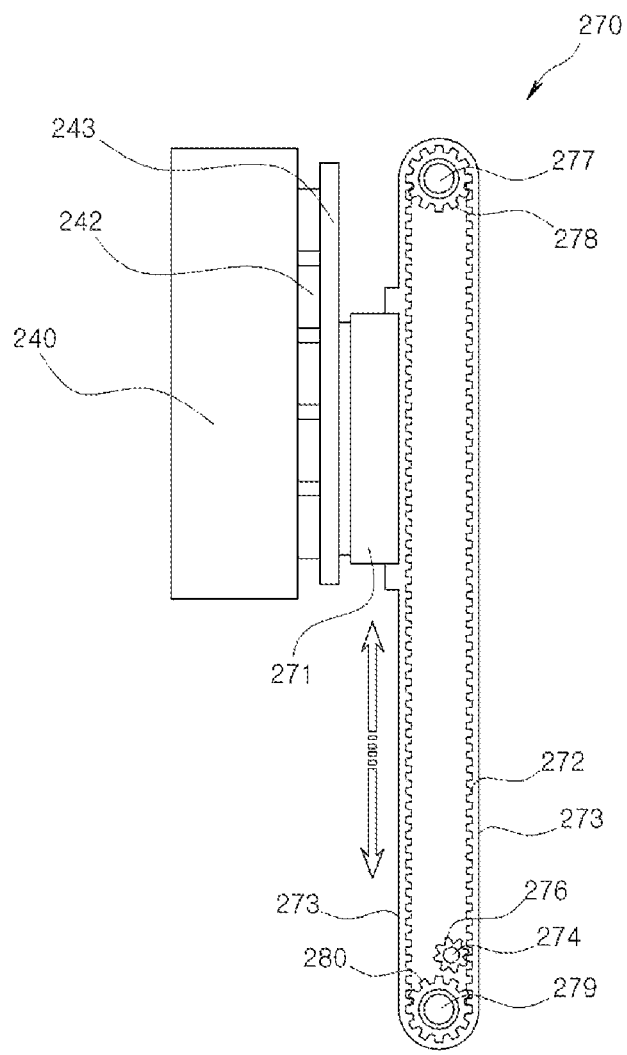
[FIG. 8]

BACKLIGHT UNIT, LIQUID CRYSTAL DISPLAY DEVICE COMPRISING SAME, AND GAME MACHINE

TECHNICAL FIELD

The present invention relates to a backlight unit, and a liquid crystal display device and a game machine including the same.

BACKGROUND ART

With increase of needs for various games, various gaming machines have been developed, and as an example, a slot machine which is used for casino game is one of gaming machines.

A gaming machine such a slot machine is provided with a plurality of reels on which symbols such as pictures or numbers are displayed, and takes a game rule that a game result is determined by combination of symbols displayed on the reels.

Recently, a liquid crystal display panel is used in a gaming machine having such a reel, and information for proceeding game or advertisement is displayed on the liquid crystal display panel.

A liquid crystal display panel is disposed in front of the reel, and in this case, symbols displayed on the reel which is disposed behind the liquid crystal display panel can be seen from the front of the liquid crystal display panel. For this function, several methods have been suggested. For example, in Korea Patent Publication No. 10-2007-0055766 (title: gaming machine having display screen), a light guide plate of a backlight unit of a liquid crystal display is made of transparent or translucent material and scratch or dot pattern is not formed on area of the light guide plate corresponding to symbol display area of the reel so that symbols of the reel can be seen from the front of the liquid crystal display through the area where the pattern is not formed, and in Korea Patent Publication No. 10-2006-0049328 (title: gaming machine), area of a diffuse sheet, a light guide plate, and a reflector of a backlight unit corresponding to symbol display area of the reel is removed and thus symbols of the reel can be seen from the front of the liquid crystal display.

However, a method suggested in Korea Patent Publication No. 10-2007-0055766 has a problem in that the area of the light guide plate on which scratch or dot pattern is not formed may deteriorate the function of uniform light penetration of the light guide plate so as to deteriorate light efficiency of the backlight unit. And, a method suggested in Korea Patent Publication No. 10-2006-0049328 has a problem in that images cannot be displayed on openings existed in the diffuse sheet, a light guide plate and a reflector and images cannot be displayed on the openings when game using the reel is not performed.

Backlight units which can be applied to these game machines have been disclosed in Korean Patent Registration No. 10-1024657 (title: dual display type displace device with function of display screen division), Korean Patent Publication No. 10-2012-0040005 (title: backlight unit with function of dual display), Korean Patent Registration No. 10-1047597 (title: dual light waveguide), Korean Patent Registration No. 10-0989401 (title: backlight unit with function of dual display), Korean Patent Registration No. 10-0984804 (title: backlight unit with function of dual display), or the like, but there are problems in that members such as a light waveguide are disposed in front of a reel so that the reel cannot be clearly seen, separate light sources should be added to the light waveguide, and the structures are complicated.

DETAILED DESCRIPTION OF THE INVENTION

Technical Problem

The present invention has been made in an effort to solve the above-mentioned problem and to provide a backlight unit for a liquid crystal display device in which a predetermined area is opened so that the symbols of the reel disposed behind can be seen, a liquid crystal display device and a gaming machine including the same.

Technical Solution

A backlight unit for a liquid crystal display device according to an exemplary embodiment of the present invention includes: a light source; a first light guiding panel which guides light emitted from the light source; a second light guiding panel which is disposed behind the first light guiding panel and is provided to be movable so as to be selectively disposed at a position of being overlapped with a predetermined area of the first light guiding panel in a back and forth direction and at a position of not being overlapped with the predetermined area in a back and forth direction; and a driving part which provides a driving force for moving the second light guiding panel.

A first light scattering pattern may be formed on a rear surface of the first light guiding panel, the first light scattering pattern being not formed on the predetermined area of the rear surface of the first light guiding panel and being formed on the remaining area of the rear surface of the first light guiding panel.

The backlight unit may further include a first reflection sheet which covers a rear surface of the first light scattering pattern.

A second light scattering pattern may be formed on a rear surface of the second light guiding panel.

The backlight unit may further include a second reflection sheet which covers a rear surface of the second light scattering pattern.

The second light guiding panel may be provided to be slidable so as to move between the position of being overlapped with the predetermined area in the back and forth direction and the position of not being overlapped with the predetermined area in the back and forth direction by a sliding operation in an upward and a downward direction.

The driving part may include: a fixing frame which is fixed to the second light guiding panel; a sliding member which is connected to the fixing frame and moves in an upward and a downward direction; and an actuator which provides a driving force for moving the sliding member in the upward and the downward direction.

The backlight unit may further include a light guide member which guides a portion of light emitted from the light source to enter into the second light guiding panel.

The light source may be disposed in the vicinity of one end of the first light guiding panel, and one end of the light guiding member may contact the other end of the first light guiding panel and the other end of the light guiding member may contact an end of the second light guiding panel when the second light guiding panel is displaced at a position of being overlapped with the predetermined area.

The light guiding member may include a connecting portion which is formed to be connected from an end of the first light guiding panel to the rear.

The connecting portion may have a curved shape.

The light guiding member may be disposed behind the first light guiding panel in parallel with the first light guiding panel, and the light source may be disposed to emit light respectively into the first light guiding panel and the light guiding member.

The backlight unit may further include a light cover which covers the outside of the light source to promote entrance of light emitted from the light source into the end of the first light guiding member and the end of the light guiding member.

A liquid crystal display device according to an embodiment of the present invention includes: a backlight unit according to one of the above-mentioned backlight units; and a liquid crystal panel which is disposed in front of the first light guiding panel of the backlight unit.

A game machine according to an embodiment of the present invention includes: a liquid crystal display device including a backlight unit according to one of the above-mentioned backlight units and a liquid crystal panel which is disposed in front of the back light; and at least one reel which is disposed behind the backlight unit and on which a plurality of symbols are displayed. The reel is disposed such that a symbol selection area on which selected symbol is displayed is overlapped with the predetermined area in a back and forth direction.

Advantages Effects

According to the present invention, since two light guiding panels which are disposed in forward and backward directions and the rear light guiding panel slides so as to be selectively overlapped with a predetermined area of the front light guiding panel, if it is applied to a game machine, a reel which is disposed behind can be selectively seen through the predetermined area.

BRIEF DESCRIPTIONS OF DRAWINGS

FIG. 1 is a perspective view of a game console according to an exemplary embodiment of the present invention.

FIG. 2 is an exploded perspective view of a liquid crystal display device and a reel of a game console according to an exemplary embodiment of the present invention.

FIG. 3 is a sectional view taken along a line III-III in FIG. 2.

FIG. 4 is a drawing for explaining relation of position of a backlight unit of a liquid crystal display device and a symbol selection area of a game console according to an exemplary embodiment of the present invention.

FIG. 5 is a drawing showing a state in which a second light guiding panel of a backlight unit moves downwardly in FIG. 3.

FIG. 6 is a sectional view showing a backlight unit of a liquid crystal display device of a game machine according to another embodiment of the present invention.

FIG. 7 is a drawing showing an example of a driving part for moving a second light guiding panel of a backlight unit according to an embodiment of the present invention.

FIG. 8 is a sectional view taken along a line VIII-VIII in FIG. 7

DETAILED DESCRIPTION OF THE EMBODIMENTS

Embodiments of the present invention will now be described hereinafter with reference to the accompanying drawings.

In the drawings, the thickness of layers, films, panels, regions, etc. are exaggerated for clarity. Like reference numerals designate like elements throughout the specification. It will be understood that when an element is referred to as being "behind" or "front" another element, it can be directly behind or front the other element or intervening elements may also be present. In contrast, when an element is referred to as being "directly behind" or "directly front" another element, there are no intervening elements present.

Referring to FIG. 1, a game machine according to an embodiment of the present invention is provided with a body 101 of a cabinet shape, and various parts and controllers for performing game may be housed in body 101.

For example, various parts which are necessary for performing game, e.g., an insert hole 103 for insertion of coin, various input buttons 105 or the like, may be provided or formed to body 101.

As shown in FIG. 2 to FIG. 4, a game machine according to an embodiment of the present invention includes a liquid crystal display device 200 which is a display device for displaying images, and a reel 300 which is disposed behind the liquid crystal display device 200.

The liquid crystal display device 200 includes a liquid crystal display panel 201 and a backlight unit 202.

The liquid crystal display device 200 may be installed to a body 101 of a game machine such that a front surface of the liquid crystal display panel 201 can be seen from the front as shown in FIG. 1. Accordingly, the liquid crystal display device 200 may play a role of an imaging display part of a game machine, and may display images such as various information or images which are required for performing games, or advertisements and is disposed to be seen.

The liquid crystal display device 200 according to an embodiment of the present invention operates to display desired images on the whole image display area of the liquid crystal panel 21 or to convert a predetermined area among the whole image display area to be transparent or translucent. At this time, "transparent or translucent" means that an object or image behind the same can be seen from the front, and "transparent or translucent" is simply written as "transparent".

The predetermined area is an area corresponding to a symbol selection area where the selected symbol of reel 300 disposed behind the liquid crystal display device 200 is disposed, and in case that the predetermined area is turned to be transparent, a symbol (e.g., a figure, a number, a picture or the like) displayed in the symbol selection area of the reel 300 disposed behind the liquid crystal display device 200 can be seen from the front of the liquid crystal display device 200.

In case that the liquid crystal display device 200 operates such that the predetermined area becomes transparent, a symbol displayed on the reel 300 can be seen from the front of a game console through the predetermined area, so a game using the symbol displayed on the reel 300 can be performed. At this time, the liquid crystal display device 200 operates such that a symbol of the reel 300 can be seen through the predetermined area, and at the same time, may display other information or images necessary for a game or other information or images on an image display area other than the predetermined area.

On the other hand, in case that the liquid crystal display device 200 operates such that the predetermined area is not transparent (e.g., displaying image on the whole image displaying area), the liquid may operate as a normal display device (i.e., the symbol of the behind reel cannot be seen and image is displayed on the whole image displaying area).

Referring to FIG. 2 and FIG. 3, the reel 300 may be housed within the body 101 of a game machine so as to be disposed behind the liquid crystal display device 200. The reel 300 may be provided as a plural, and the respective reel 300 may be disposed adjacently in parallel. The respective reel 300 may be formed to rotate independently.

For example, the reel 300 may include a reel drum 301 and a reel strip 303 which is attached to an outer surface of the reel drum 301. And a motor (not shown) for rotating the reel drum 301 may be provided.

A backlight unit, and a liquid crystal display for realizing this function according to an embodiment of the present invention and a game machine including the same will be described in detail hereinafter.

Referring to FIG. 2 to FIG. 6, the liquid crystal display device 200 includes the liquid crystal panel 210 and the backlight unit 202 which are disposed back and forth in a line.

The liquid crystal panel 210 may be a conventional transparent liquid crystal panel, and for example, may be formed by sealing liquid crystal in a space formed between two facing transparent panels such as a glass panel on which thin film transistors are formed. At this time, a default display mode of the liquid crystal panel 201 may be set as a normally white. "Normally white" means that a white display state (light can penetrate toward a display surface, i.e., light penetrating through a display surface can be from the outside) is realized while a liquid crystal panel is not operated.

The backlight unit 202 acts as a light source of the liquid crystal display device 200 and is disposed behind the liquid crystal panel 201.

Meanwhile, not shown in the drawing, the liquid crystal display device 200 may further include a chassis including various frames and holders for assembling the liquid crystal panel 201 and the backlight unit 202. In addition, the liquid crystal display device 200 may further include well known various parts such as a driving circuit for driving the liquid crystal panel 201, etc. Gap between the liquid crystal panel 201 and the backlight unit 202 is enlarged for ease of description, but both may contact each other and may be disposed with a small gap.

The backlight unit 202 provides light for image display of the liquid crystal display device 200, and includes a light source 220 and a plurality of light guiding panels 230 and 240. Hereinafter, the light guiding panel designated by reference numeral 230 is referred to as a first light guiding panel and the light guiding panel designated by reference numeral 240 is referred to as a second light guiding panel.

The light source 220 may be realized as an arbitrary device which can emit light, and for example may be realized as a bar-shaped lamp and may be disposed in the vicinity of a lower edge of the first light guiding panel 230.

The first and the second light guiding panels 230 and 240 play a role of receiving at least a portion of light emitted from the light source 220 and guiding the light to travel toward the liquid crystal panel 201 which is disposed in front of them.

The first light guiding panel 230 may be disposed behind the liquid crystal panel 201 to be overlapped in a back and forth direction and may have a size and a shape which are approximately equal to the image display area of the liquid crystal panel 201.

The second light guiding panel 240 is disposed behind the first light guiding panel 230 and may be installed to be slidable so as to be displaced selectively at a position which is overlapped with a predetermined area PA of the first light guiding panel 230 in a back and forth direction or at a position which is not overlapped with the same. For example, the second light guiding panel 240 may be movable in an upward and downward direction in FIG. 2 and FIG. 3 so as to be selectively displaced at a position (a state shown in FIG. 3) which is overlapped with the predetermined area PA of the first light guiding panel 230 or at a position (shown in FIG. 5) which is not overlapped with the predetermined area PA of the first light guiding panel 230. In FIG. 5, the second light guiding panel 240 is overlapped with the predetermined area PA in a back and forth direction in a state shown in a dotted line, and is not overlapped with the predetermined area PA in a back and forth direction in a state shown in a solid line.

For example, the second light guiding panel 240 may be installed so as to move between a position of being overlapped with the predetermined area PA in a back and forth direction and a position of not being overlapped with the predetermined area PA via a sliding operation in a vertical direction.

Here, the predetermined area PA of the first light guiding panel 230 is an area covering a symbol selection area of the reel 300 which is disposed therebehind, and may have a shape, a size and a position corresponding to the symbol selection area. That is, referring to FIG. 2 and FIG. 3, the predetermined area PA of the first light guiding panel 230 is an area covering the symbol selection area of the reel and is disposed to be overlapped with the same.

Accordingly, in case that the second light guiding panel 240 is displaced at a position of being overlapped with the predetermined area PA (i.e., the state of FIG. 3), the predetermined area PA, the second light guiding panel 240 and the symbol selection of the reel 300 are disposed to be overlapped with one another and thus the symbol selection area of the reel 300 is blocked by the second light guiding panel 240, and on the other hand, in case that the second light guiding panel 240 is displaced at a position of not being overlapped with the predetermined area PA in a back and forth direction (i.e., the state of FIG. 5), the second light guiding panel 240 deviates from the area where the predetermined area PA and the symbol selection area of the reel 300 are overlapped with one another, so the symbol selection area of the reel 300 is not blocked by the second light guiding panel 240.

A driving part 270 which provides a driving force for moving the second light guiding panel 240. The driving part 270 is not shown in FIG. 2 to FIG. 5 for convenience, and the driving part 270 will be described later referring to FIG. 7.

A first light scattering pattern 232 may be formed at a rear surface of the first light guiding panel 230. At this time, the first light scattering pattern 232 may be not formed on the predetermined area PA among the rear surface 231 of the first light guiding panel 230 and may be formed on the remaining area. Further, a second light scattering pattern 242 may be formed on a rear surface of the second light guiding panel 240.

Since a light scattering pattern is not formed on the predetermined area PA among the rear surface 231 of the first light guiding panel 230, a light scattering pattern does not exist on an area which overlaps with the symbol selection area of the reel 300 in a back and forth direction in case that the second light guiding panel 240 is not overlapped with the predetermined area PA, so the symbol selection area of the reel 300 can be clearly seen from the front. In addition, since the second light scattering pattern 242 is formed on the rear surface of the second light guiding panel 240, in case that the second light guiding panel 240 is overlapped with the predetermined area PA in a back and forth direction, the symbol selection area of the reel 300 is not seen from the front and at the same time light can progress to the whole area of the liquid crystal display device 200 so that overall light characteristics can be improved.

Further, a first reflection sheet 233 which covers the rear surface of the first light scattering pattern 232 may be provided, and a second reflection sheet 243 which covers the rear surface of the second light scattering pattern 242 may also be provided. Since the reflection sheets 233 and 243 are provided, light which enters into the light guiding panels 230 and 240 can progress more effectively toward the liquid crystal panel 201, so overall light characteristics can be improved.

Meanwhile, the backlight unit 202 according to an embodiment of the present invention may include a light guide member 250 which guide a portion of light emitted from the light source 220 to enter into the second light guiding panel 240.

Referring to FIG. 2, the light source 220 may be disposed in the vicinity of one end (lower end in FIG. 2 and FIG. 3) of the first light guiding panel 230, and the light guiding member 250 may be disposed in the vicinity of the other end (i.t., upper end in FIG. 2 and FIG. 3).

One end 251 of the light guiding member 250 may contact one end of the first light guiding panel 230 and the other end thereof may contact an end (upper end in FIG. 3) when the second light guiding panel 240 is disposed to be overlapped with the predetermined area PA (i.e., in a state of FIG. 3). For this structure, the light guiding member 250 may include a connecting portion 255 which extends from an end of the first light guiding member 230 to the rear side thereof. At this time, the connecting portion 255 may have a curved shape as shown in the drawings.

Accordingly, in case that the second light guiding panel 240 is displaced at a position shown in FIG. 3, a portion of light emitted from the light source 220 enters into the end 251 of the light guiding member 250 via the upper portion of the first light guiding panel 230 and then enters into the second light guiding panel 240 via the other end 253 after passing through the connecting portion 255. Accordingly, light can evenly progress to the whole area of the image display area of the liquid crystal display device 200, so the display characteristics can be improved.

FIG. 6 is a sectional view showing a backlight unit of a liquid crystal display device of a game machine according to another embodiment of the present invention.

Referring to FIG. 6, a light guiding member 260 may have a planar plate which is disposed behind the first light guiding panel 230. The light guiding member 260 may be disposed behind the first light guiding panel 230 in parallel with the same.

At this time, the light source 220 may be disposed so as to respectively emit into the first light guiding panel 230 and the light guiding member 260. That is, as shown in FIG. 6, the light source 220 may be disposed to be adjacent respectively to the first light guiding panel 230 and the light guiding member 260 which are disposed in parallel with one another. At this time, the two light sources 220 are provided and are disposed to be adjacent respectively to an upper end of the first light guiding panel 230 and an upper end of the light guiding member 260. Meanwhile, in another embodiment, one light source 220 is provided and light emitted from one light source 220 may emit into an upper end of the first light guiding panel 230 and into an upper end of the light guiding member 260.

Further, a light cover 221 may be provided in order to promote the entrance of light emitted from the light source 220 into the upper end of the first light guiding panel 230 and the upper end of the light guiding member 260. Since the light cover 221 has a shape of covering the outside of the light source 220 and being open toward the upper end of the first light guiding panel 230 and the upper end of the light guiding member 260, the light emitted from the light source 220 can be prevented from being leaked toward the outside and is promoted to enter into the upper end of the first light guiding panel 230 and the upper end of the light guiding member 260.

The driving part of the backlight unit according an embodiment of the present invention will be described hereinafter referring to FIG. 7 and FIG. 8.

The driving part 270 may be provided with a fixing frame 271 which is fixed to the second light guiding panel 240. As shown in FIG. 7, the fixing frame 271 may be fixed to the second light guiding panel 240 in a state of being disposed at the rear of the second light guiding panel 240. Concrete connections between the fixing frame 271 and the second light guiding panel 240 has been omitted for ease of description.

A sliding member 273 is connected to the fixing frame 271, and the sliding member 273 is formed to move upwardly and downwardly. For example, the sliding member 273 may be a belt.

Meanwhile, an actuator 275 for providing a driving force for moving the sliding member 273 in an upward and a downward direction, and for example, the actuator 275 may be an electric motor.

Referring to FIG. 8, the actuator 275 may be provided with a rotating output shaft 274, and gear teeth 276 may be provided to the output shaft 274. Further, gear teeth 272 which are engaged with the gear teeth 276 of the actuator 275 may be formed. Meanwhile, rotating shafts 277 and 279 may be provided in a rotatable state at an upper side and at a lower side of the second light guiding panel 240, and the rotating shafts 277 and 279 may be respectively provided with gear teeth 278 and 280 which are engaged with the gear teeth of the belt 273. Not shown in the drawing, the rotating shafts 277 and 279 may be rotatably connected to a frame which is not shown.

With these connections, in case that the output shaft 274 of the actuator 275 rotates, the belt 273 which is engaged with the same rotates to slide. Accordingly, the fixing frame 271 moves, and accordingly the second light guiding panel 240 moves upwardly or downwardly depending on the rotating direction of the belt 273.

The position of the second light guiding panel 240 can be determined by the operation of the driving part 270, and accordingly the second light guiding panel 240 can be selectively disposed one of the position (the state shown in FIG. 3) of being overlapped with the predetermined area PA in a back and forth direction and the position (the state shown in FIG. 5) of not being overlapped with the predetermined area PA in a back and forth direction.

Meanwhile, not shown in the drawing, a controller for controlling the operation of the actuator 275 may be provided, and for example, the controller may operate the actuator 275 by outputting a control signal for regulating the position of the second light guiding panel 240.

In case that the second light guiding panel 240 are displaced at a position of being overlapped with the predetermined area PA in a back and forth direction, the symbol selection area of the reel 300 is not seen from the front and by displaying images on the whole of the image display area of the liquid crystal panel 201 the liquid crystal panel 201 can operate as a normal display device. Meanwhile, in case that the second light guiding panel 240 is displaced at a position of not being overlapped with the predetermined area PA in a back and forth direction, the predetermined area PA of the liquid crystal panel 201 are controlled to be transparent (for example, the state of normally white) by the control of alignment of liquid crystal, the symbol selection area of the reel 300 can be seen from the front through the predetermined area PA. Accordingly, an image may be displayed on the whole area of the image display area, or the symbol selection area of the reel 300 may be seen from the front through the predetermined area PA.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention can be applied to game machines, to the present invention has an industrial applicability.

The invention claimed is:

1. A backlight unit for a liquid crystal display device comprising:
   a light source;
   a first light guiding panel which guides light emitted from the light source;
   a second light guiding panel which is disposed behind the first light guiding panel and is provided to be movable so as to be selectively disposed at a position of being overlapped with a predetermined area of the first light guiding panel in a back and forth direction and at a position of not being overlapped with the predetermined area in a back and forth direction; and
   a driving part which provides a driving force for moving the second light guiding panel,
   wherein a first light scattering pattern is formed on a rear surface of the first light guiding panel, the first light scattering pattern being not formed on the predetermined area of the rear surface of the first light guiding panel and being formed on the remaining area of the rear surface of the first light guiding panel.

2. The backlight unit of claim 1, further comprising a first reflection sheet which covers a rear surface of the first light scattering pattern.

3. The backlight unit of claim 1, wherein a second light scattering pattern is formed on a rear surface of the second light guiding panel.

4. The backlight unit of claim 3, further comprising a second reflection sheet which covers a rear surface of the second light scattering pattern.

5. The backlight unit of claim 1, wherein the second light guiding panel is provided to be slidable so as to move between the position of being overlapped with the predetermined area in the back and forth direction and the position of not being overlapped with the predetermined area in the back and forth direction by a sliding operation in an upward and a downward direction.

6. The backlight unit of claim 1, wherein the driving part comprises:
   a fixing frame which is fixed to the second light guiding panel;
   a sliding member which is connected to the fixing frame and moves in an upward and a downward direction; and
   an actuator which provides a driving force for moving the sliding member in the upward and the downward direction.

7. The backlight unit of claim 1, further comprising a light guide member which guides a portion of light emitted from the light source to enter into the second light guiding panel.

8. The backlight unit of claim 7, wherein the light source is disposed in the vicinity of one end of the first light guiding panel, and one end of the light guiding member contacts the other end of the first light guiding panel and the other end of the light guiding member contacts an end of the second light guiding panel when the second light guiding panel is displaced at a position of being overlapped with the predetermined area.

9. The backlight unit of claim 8, wherein the light guiding member comprises a connecting portion which is formed to be connected from an end of the first light guiding panel to a top of the second light guiding panel.

10. The backlight unit of claim 9, wherein the connecting portion has a curved shape.

11. The backlight unit of claim 7, wherein the light guiding member is disposed behind the first light guiding panel in parallel with the first light guiding panel, and the light source is disposed to emit light respectively into the first light guiding panel and the light guiding member.

12. The backlight unit of claim 11, further comprising a light cover which covers the outside of the light source to promote entrance of light emitted from the light source into the end of the first light guiding member and the end of the light guiding member.

13. A liquid crystal display device comprising:
   a backlight unit according to claim 1; and
   a liquid crystal panel which is disposed in front of the first light guiding panel of the backlight unit.

14. A game machine comprising:
   a liquid crystal display device comprising a backlight unit according to claim 1 and a liquid crystal panel which is disposed in front of the back light; and
   at least one reel which is disposed behind the backlight unit and on which a plurality of symbols are displayed,
   wherein the reel is disposed such that a symbol selection area on which selected symbol is displayed is overlapped with the predetermined area in a back and forth direction.

* * * * *